(12) United States Patent
Branover et al.

(10) Patent No.: US 8,112,647 B2
(45) Date of Patent: Feb. 7, 2012

(54) PROTOCOL FOR POWER STATE DETERMINATION AND DEMOTION

(75) Inventors: Alexander Branover, Chestnut Hill, MA (US); Frank P. Helms, Austin, TX (US); John P. Petry, San Diego, CA (US); Maurice B. Steinman, Marlborough, MA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 764 days.

(21) Appl. No.: 12/254,650

(22) Filed: Oct. 20, 2008

(65) Prior Publication Data

US 2010/0058078 A1 Mar. 4, 2010

Related U.S. Application Data

(63) Continuation-in-part of application No. 12/198,974, filed on Aug. 27, 2008.

(51) Int. Cl.
*G06F 1/26* (2006.01)

(52) U.S. Cl. ........................................ 713/320; 710/260

(58) Field of Classification Search .......... 713/320–323; 710/260–262
See application file for complete search history.

(56) References Cited

U.S. PATENT DOCUMENTS

| | | | |
|---|---|---|---|
| 5,740,417 A | 4/1998 | Kennedy et al. | |
| 6,510,525 B1 | 1/2003 | Nookala et al. | |
| 6,553,501 B1 | 4/2003 | Yokoe | |
| 6,954,864 B2 | 10/2005 | Schelling | |
| 6,988,214 B1 | 1/2006 | Verdun | |
| 7,089,437 B2 | 8/2006 | Swoboda | |
| 7,152,169 B2 | 12/2006 | Cooper et al. | |
| 7,159,766 B2 | 1/2007 | Wurzburg et al. | |
| 7,200,762 B2 | 4/2007 | Pearl | |
| 2009/0150696 A1 | 6/2009 | Song et al. | |
| 2009/0164814 A1 | 6/2009 | Axford et al. | |

OTHER PUBLICATIONS

"Advanced Configuration and Power Interface Specification"; Hewlett-Packard Corporation, Intel Corporation, Microsoft Corporation, Phoenix Technologies Ltd., Toshiba Corporation; Oct. 10, 2006; 631 pages.

*Primary Examiner* — Clifford Knoll
(74) *Attorney, Agent, or Firm* — Meyertons Hood Kivlin Kowert & Goetzel, P.C.; Jeffrey C. Hood

(57) ABSTRACT

A system may comprise a plurality of processing units, and a control unit and monitoring unit interfacing with the processing units. The control unit may receive requests for transitioning the processing units to respective target power-states, and specify respective target HW power-states corresponding to the respective target power-states. The monitoring unit may monitor operating characteristics of the system, and determine based on operating characteristics whether to allow the processing units to transition to the respective target hardware (HW) power-states. The control unit may be configured to change the respective target HW power-state to a respective updated HW power-state for each processing units for which it is determined that transition to its respective target HW power-state should not be allowed. The control unit may also be configured to infer a common target HW power-state based on the respective target HW power-states of processing units of a subset of the plurality of processing units, when the processing units of the subset of the plurality of processing units share at least one resource domain.

36 Claims, 11 Drawing Sheets

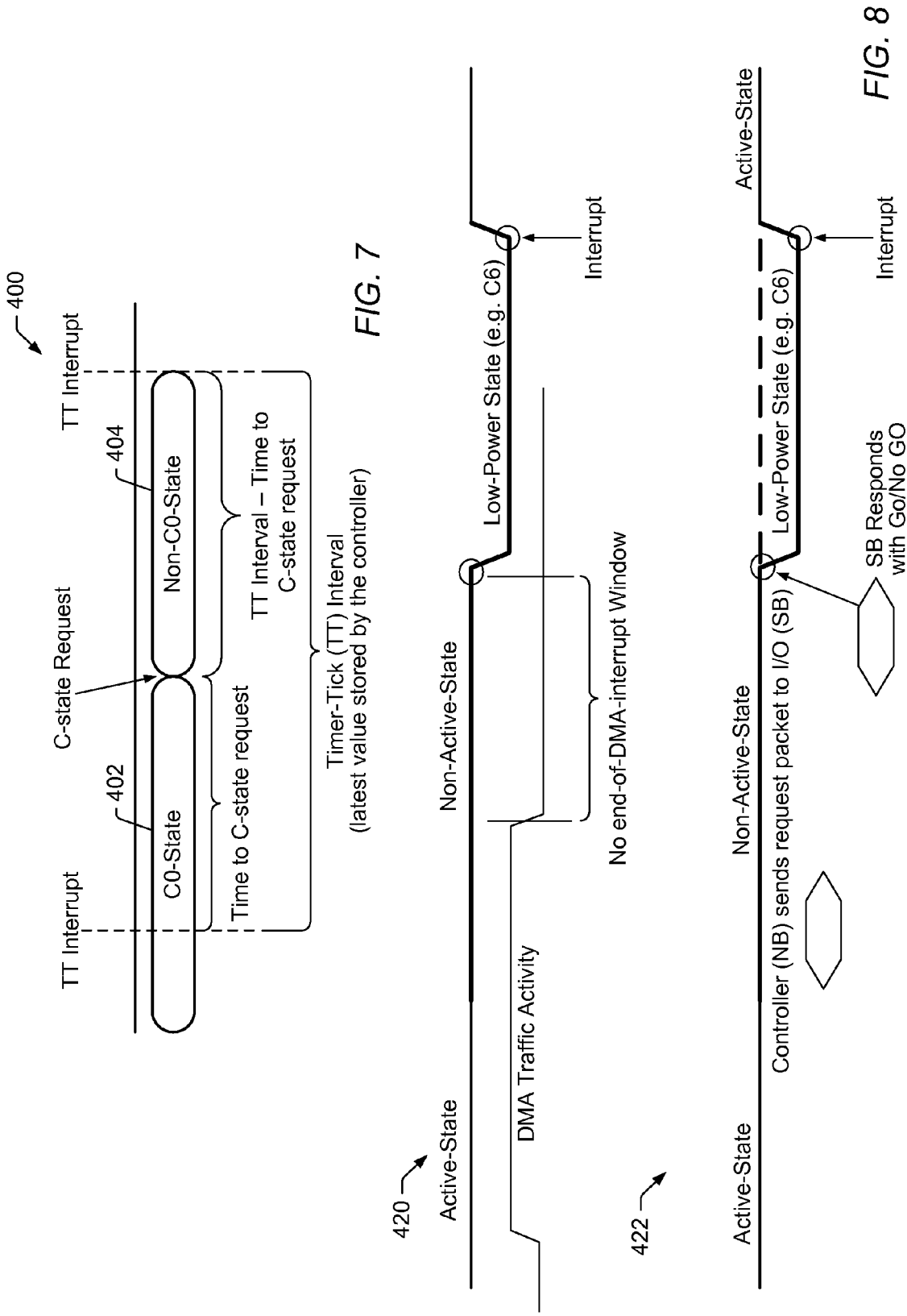

500 →

|  | Core0 C-state ||||||| 
|---|---|---|---|---|---|---|---|
|  | C0 | C1 | C2 | C3 | C4 | C5 | C6 |
| C0 | C0 | C0 | C0 | C0 | C0 | C0 | C0 |
| C1 | C0 | C1 | C1/C2 | C1/C3 | C1/C4 | C1/C4 | C1/C6 |
| C2 | C0 | C2/C1 | C2 | C2/C3 | C2/C4 | C2/C5 | C2/C6 |
| C3 | C0 | C1/C3 | C2/C3 | C3 | C3/C4 | C3/C5 | C3/C6 |
| C4 | C0 | C1/C4 | C2/C4 | C3/C4 | C4 | C4/C5 | C4/C6 |
| C5 | C0 | C1/C5 | C2/C5 | C3/C5 | C4/C5 | C5 | C5/C6 |
| C6 | C0 | C1/C6 | C2/C6 | C3/C6 | C4/C6 | C5/C6 | C6 |

(Core1 C-state on left axis)

|  | Core0 C-state ||||
|---|---|---|---|---|
|  | C0 | C1-C3 | C4-C5 | C6 |
| C0 | C0 | C0 | C0 | C0 |
| C1-C3 | C0 | C1-C3 | C1-C3/C4-C5 | C1-C3/C6 |
| C4-C5 | C0 | C1-C3/C4-C5 | C4-C5 | C4-C5/C6 |
| C6 | C0 | C1-C3/C6 | C4-C5/C6 | C6 |

(Core1 C-state on left axis)

*FIG. 10*

PROTOCOL FOR POWER STATE DETERMINATION AND DEMOTION

PRIORITY CLAIM

This application is a continuation-in-part of U.S. utility application Ser. No. 12/198,974 titled "Hardware Monitoring and Decision Making for Transitioning In and Out of Low-Power State" filed Aug. 27, 2008, whose inventors were Alexander Branover, Frank Helms, and Maurice Steinman, and which is hereby incorporated by reference in its entirety as though fully and completely set forth herein.

BACKGROUND OF THE INVENTION

1. Field of the Invention

This invention relates generally to the field of computer design and, more particularly, to the design of a monitoring and decision making protocol for hardware power-state determination and demotion.

2. Description of the Related Art

The ever increasing advances in silicon process technology and reduction of transistor geometry makes static power (leakage) a more significant contributor in the power budget of processors (CPUs). Currently known CPU ACPI (Advanced Configuration and Power Interface) and ACPI-based low-power states (C1-C5) are very instrumental in eliminating dynamic power consumption and reducing the CPU static power. The ACPI is an open industry standard originally developed by Hewlett-Packard, Intel, Microsoft, Phoenix, and Toshiba, and defines common interfaces for hardware recognition, motherboard and device configuration and power management. The most widely recognized element of ACPI is power management, offering improvements over past power management methods by giving the Operating System (OS) control of power management, in contrast with prior power management models where power management control was mainly under the control of the BIOS, with limited intervention from the OS. In ACPI, the BIOS provides the OS with methods for directly controlling the low-level details of the hardware, providing the OS with nearly complete control over the power savings.

Another important feature of ACPI is bringing power management features previously only available in portable computers to desktop computers and servers. For example, systems may be put into extremely low consumption states, i.e., states in which only memory, or not even memory, is powered, but from which "general-purpose events" (GPEs, similar to interrupts, which can be sent by devices such as the real-time clock, keyboard, modem, etc.) can quickly wake the system. ACPI uses its own ACPI Machine Language (or AML) for implementing power event handlers, rather than the native assembly language of the host system, and while the AML code is typically part of firmware (BIOS) it is interpreted by the OS.

The ACPI specifies various groups of states, among them global states, device states, performance states, and processor states. For example, the ACPI standard defines four processor power states, C0-C3. C0 is the operating state. C1 (often referred to as Halt state) is a state in which the processor is not executing instructions, but can (essentially) instantaneously return to an executing state. Some processors also support an Enhanced C1 state (C1E) for lower power consumption. C2 (often known as Stop-Clock state) is a state in which the processor maintains all software-visible states at the expense of possibly taking longer to wake up. C3 (often known as Sleep state) is a state in which the processor does not need to keep its cache coherent, but does maintain other states. Some processors have variations on the C3 state (Deep Sleep, Deeper Sleep, etc.) that differ in how long it takes the processor to wake up. While the ACPI specifies 4 states (C0-C3), processors can have independently defined hardware states that range from C0 to C5 and beyond, as previously mentioned. A processor generally supports each of those C-states, which are typically mapped to a particular ACPI C-state depending on the behavior of the processor while in that state, as defined by ACPI. However, none of these states completely eliminates the static power component consumed by the processor. Therefore the efficiency of C1-C5 states for power saving is becoming more limited for advanced CPU manufacturing process technologies and smaller transistor geometries.

Various methods have been proposed and implemented to lower power consumption as much as possible. For example, power consumption may be lowered by sizing-down, invalidating, and eventually turning-off the L2 cache by lowering the retention voltage to a level lower than is needed to retain L2 contents. This is also known as the C5-state. While this offers one possible solution in eliminating the massive L2 component from the static power consumption budget, it does not eliminate the power consumption contribution of smaller arrays (e.g. L1 cache) or regular logic, thus maintaining static power at fairly high level for advanced (45 nm and lower) processes.

A new state, the C6 state, first introduced by Intel in 2007, allows for complete elimination of both dynamic and static components of power consumption, by transitioning the CPU to the zero-state where 0V is applied to the CPU voltage plane, and the CPU clock is completely turned off. It should be noted that the C6-state is not equivalent to system sleep state S3 where most of the system is powered down, and restoration to the C0-state requires an extended period of time, oftentimes in the range of many seconds. The C6-state can be applied to a single-core processor or to any core or group of cores in multi-core processors, while keeping other cores and system components (chipset, I/O, DRAM) in fully functional state. At the moment the OS indicates the need for allocating some task/process on a given CPU that is presently in the C6-state, that given CPU is powered-up and becomes available for executing the requested task/process. Generally, the C6-state provides enablement for a more aggressive performance-oriented approach to CPU process technology (for example reducing the transistor effective length), which would otherwise be impeded by the inevitable increase in static power consumption. Effectively managing a processor's transitioning in and out of the C6-state can therefore lead to improved power management and result in reduced overall power consumption.

Other corresponding issues related to the prior art will become apparent to one skilled in the art after comparing such prior art with the present invention as described herein.

SUMMARY OF THE INVENTION

In one set of embodiments, a processor comprised in a system may include a first processing core, and a controller interfacing with the first processing core. The controller may be configured to receive requests to transition the first processing core to specific target power-states, which may include low power and zero-volt states. The controller may specify a target hardware (HW) power-state corresponding to the target power-state, and may in addition monitor one or more operating characteristics of the system, and determine based on those characteristics whether to allow the processing core to transition to the target HW power-state. The controller may change the target HW power-state to an updated HW power-state in response to a determination that transition to the target HW power-state should not be allowed, and may facilitate transition of the processing core to the target HW power-state in response to a determination that a transition to the HW target power-state should be allowed.

In another set of embodiments, the processor may comprise a plurality of processing cores. The controller may be configured to receive respective requests for transitioning any one or more of the plurality of processing cores to respective target power-states, and specify respective target HW power-states corresponding to the respective target power-states. The controller may determine based on the one or more operating characteristics of the system whether to allow the one or more of the plurality of processing cores to transition to their respective target hardware HW power-states, and change the respective target HW power-state to a respective updated HW power-state for each of the one or more additional cores for which it is determined that transition to its respective target HW power-state should not be allowed. The controller may facilitate transition to its respective target HW power-state for each one of the one or more additional processing cores for which it is determined that transition to its respective HW target power-state should be allowed.

In one set of embodiments, the controller may also infer a common target HW power-state based on the respective target HW power-states of processing cores of a subset of the plurality of processing cores, where the processing cores of the subset of the plurality of processing cores share at least one resource domain. The shared resource domain may be a supply voltage, clock domain, or may correspond to other similar resources on which the processing core may rely for operation. The common target HW power-state may be used to replace the respective target HW power-state of each processing core of the subset of the plurality of processing cores.

In inferring the common target HW power-state, when the respective requests for transitioning any one or more of the plurality of processing cores to respective target power-states comprise a single request for transitioning the processing cores of the subset of the plurality of processing cores to a first respective target power-state, the controller may designate the respective HW power-state that corresponds to the first respective target power-state to be the common target HW power-state. When the respective requests comprise a respective request for each processing core of the subset of the plurality of processing cores to transition to a respective target power-state, the controller may select the common target HW power-state from the respective target HW power-states of the processing cores of the subset of the plurality of processing cores.

In one set of embodiments, the controller may be configured to select the common target HW power-state according to a performance bias or a power bias. In case of a performance bias, the controller may select a respective target HW power-state—from the respective target HW power-states of the processing cores of the subset of the plurality of processing cores—representing a higher performance than the other respective target HW power-states, when at least two of the respective target HW power-states represent different respective performance levels. In case of a power bias, the controller may select a respective target HW power-state—from the respective target HW power-states of the processing cores of the subset of the plurality of processing cores—representing a lower power consumption level than the other respective target HW power-states, when at least two of the respective target HW power-states represent different respective power consumption levels.

The controller described above may be adapted to interface with processing units or any other system components, when it is desirable to transition the processing units and/or other system components in and out of various different power-states. For example, a system may comprise processors, and the controller may perform the above described functions with respect to the processors, instead of the processing cores. It should also be noted that various embodiments of systems configured to transition processing units or various system components to various power-states according to the principles described herein are possible and are contemplated, and managing such transitions is not meant to be limited only to processor/processing cores and/or processors.

BRIEF DESCRIPTION OF THE DRAWINGS

Other aspects of the invention will become apparent upon reading the following detailed description and upon reference to the accompanying drawings in which:

FIG. 7 is a timing/state diagram of one embodiment of a protocol for predicting timer tick interrupts;

FIG. 8 is a timing/state diagram of one embodiment of a protocol for predicting I/O based and end-of-DMA interrupts;

FIG. 9 shows one embodiment of a coordination table for each pair of applicable power-states used in a power-state inference algorithm;

FIG. 10 shows one embodiment of a coordination table for groups of applicable power-states used in a power-state inference algorithm;

Figure 1:
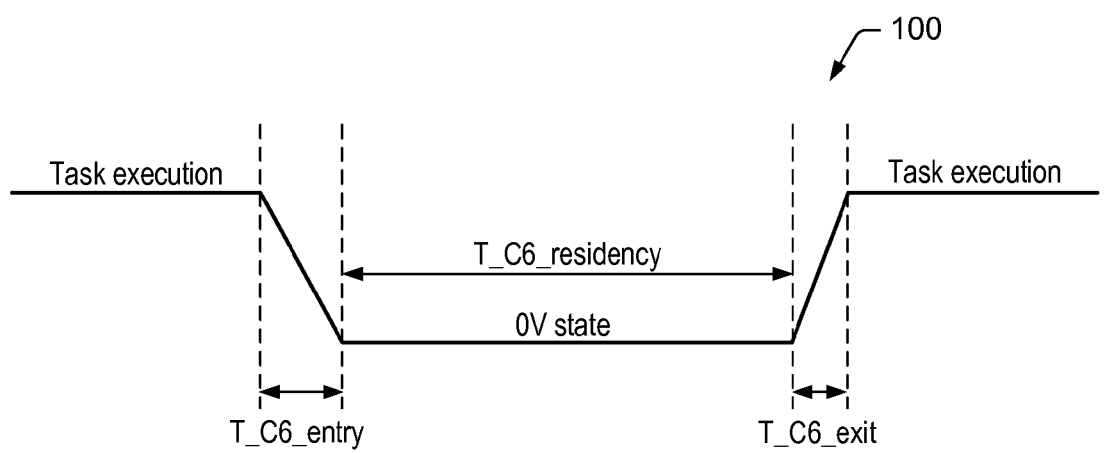
FIG. 1 shows a conceptual diagram of transitioning between an operating state and C6-state (0V-state), to illustrate C6-state residency trade-off between transition times and power.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

A zero-power or zero-volt (0V) state, otherwise referred to as C6-state may allow for complete elimination of both dynamic and static components of power consumption, by transitioning a processor core (or multiple processor cores) to a state in which the respective supply voltage of the processor core may be reduced to 0V, and the operating clock used by the processor core may be uncoupled from the processor core, or gated off from the processor core, meaning simply that the clock signal may be prevented from reaching the processor core. Alternately, the operating clock used by the processor may be completely turned off, e.g. when no other system components depend on the same clock. C6-state is not equivalent to system sleep, e.g. state S3 where most of the system is powered down, and restoration to the operating state (C0-state) may require an extended period of time, oftentimes many seconds. C6-state may be applied to a single-core processor or to any core or group of cores in multi-core processors, while keeping other cores and system components (e.g. chipset, I/O, DRAM) in a fully functional state. Similarly, C6-state may be applied to single-core microcontrollers or to any core or group of cores in multi-core microcontrollers, while keeping other cores and system components in a fully functional state. In general, transitioning in and out of C6-state as set forth and disclosed herein is not meant to be limited to processors and microcontrollers, and may equally be applicable to other similar circuits and/or processing units configured in various systems, for example digital signal processing units, graphics processing units, etc.

When the Operating System (OS) or a high-level program indicates the need for allocating certain tasks/processes to execute on a processor core that is currently in C6-state, the processor core may be powered-up and may become available for executing the requested tasks/processes. Generally, the C6-state may provide enablement for a more aggressive performance-oriented approach to processor fabrication process technology—for example, reducing the effective transistor channel-length—which would otherwise be impeded by the inevitable increase in static power consumption. In one set of embodiments, a protocol between microcode executing on a processor core configured within a processor, and a first circuit (or control circuit or controller, such as a North Bridge controller for example), also configured within the processor may be used for transitioning the processor core to C6-state. In general, the protocol may be used for effectively transitioning any one or more processor cores in and out of C6-state. By performing transition to low power states, e.g. to C6-state, without requiring any control signals from outside the processor, for example from a South Bridge, a more efficient and less complicated transition to a low-power state, or zero-power state may be achieved. In effect, a single chip processor, that is, a processor implemented as an integrated circuit (IC) may conduct transition of one or more of its cores to a low-power state based on an interrupt signal generated by circuitry on the processor die itself.

In one set of embodiments, either OS or HW-based inference logic tracking a processor's (CPU's) idle state may request the core (or any one or more of all the cores) of the processor to transition into C6 (0V) state. As used herein, C6-state refers to a zero-power state, which may itself refer to a zero-volt (0V) state. In certain embodiments, a zero-power state may be defined as a lowest-voltage state that is not exactly 0V, based on the particular requirements of any given system. Those skilled in the art will appreciate that zero-power state is not necessarily limited to 0V, and the protocol described herein may be used for transitioning to a zero-power state independently of the value of the actual voltage level associated with the zero-power level. In one set of embodiments, transitioning to C6-state may include the following steps:

(1) Storing (flushing) the updated contents of the processor caching system (e.g. L1, L2, L3, etc.) to the main (system) memory.

(2) Saving the architectural and system state in some powered-on storage.

(3) Turning down the processor clocking system.

(4) Reducing the supply voltage (powering the processor core) to 0V.

The architectural and system state may need to be saved in order to correctly and deterministically resume execution of the instruction stream when the processor core is transitioned back into the operational (C0) state. The architectural and system state may be saved either in external memory (e.g. system memory, DRAM) or in some on-die storage capacity that is not powered down in C6-state, and would therefore be configured outside of the processor core being placed in the C6-state. A processor core residing in C6-state may transition back to the operational state (C0) when one or more tasks need to be allocated to the processor core for execution. This may be requested via an interrupt signal or message. Transition from C6-state to C0-state may include the following steps:

(1) Restoring the supply voltage level of the processor core to operational level.

(2) Relocking the PLL.

(3) Resetting the processor core's internal state.

(4) Restoring the processor core's architectural and system state by reading the saved state from the external memory or on-die storage capacity where it was stored during transitioning to C6-state.

It should be noted that while one or more processor cores of a multi-core processor are in C6-state, other cores may remain in a fully operational state, executing tasks. If I/O devices send coherent probes while a processor core is in C6-state, the processor core's caching system may not need to be snooped, since its dirty (modified) contents would have been saved in main memory during the transition to C6-state.

One of the factors that may help achieve maximum power savings when placing a processor core (or multiple processor cores) is in C6-state is decreasing C6-state entry and exit times, while maximally lowering power consumption during those C6-state entry and exit times. Another key factor may be increasing C6-state residency. FIG. 1 provides a conceptual overview of the trade-off between transitioning into C6-state and C6-state residency. As shown in diagram 100, the overall time T (for C6-state entry, residency and exit) may be a sum of $T\_C6\_entry + T\_C6\_residency + T\_C6\_exit$. The overall power consumption P_C6 while in C6-state may then be calculated as $$P\_C6 = P\_entry * (T\_C6\_entry/T) + P\_exit * (T\_C6\_exit/T). \quad (1)$$

This implies that in order to keep P_C6 as close to 0 W as possible, the entry and exit times may need to be significantly lower than T_C6-residency. Another requirement may be to keep P_entry and P_exit lower than a specified threshold value. This may be implemented as a part of the C6-state entry/exit configuration, whereby the process of transitioning in and out of C6-state takes place in the operational state of the processor core characterized by the lowest power consumption. Additional requirements may include keeping the zero-power voltage configurable. As also previously indicated, the zero-power voltage may be defined higher than 0V (e.g. 0.2V~0.4V) trading off between low leakage and faster transition time (the higher the zero-power voltage, the shorter the transition time from operational state (C0) to C6-state.

Protocol Between Microcode and NB Controller

Figure 2:
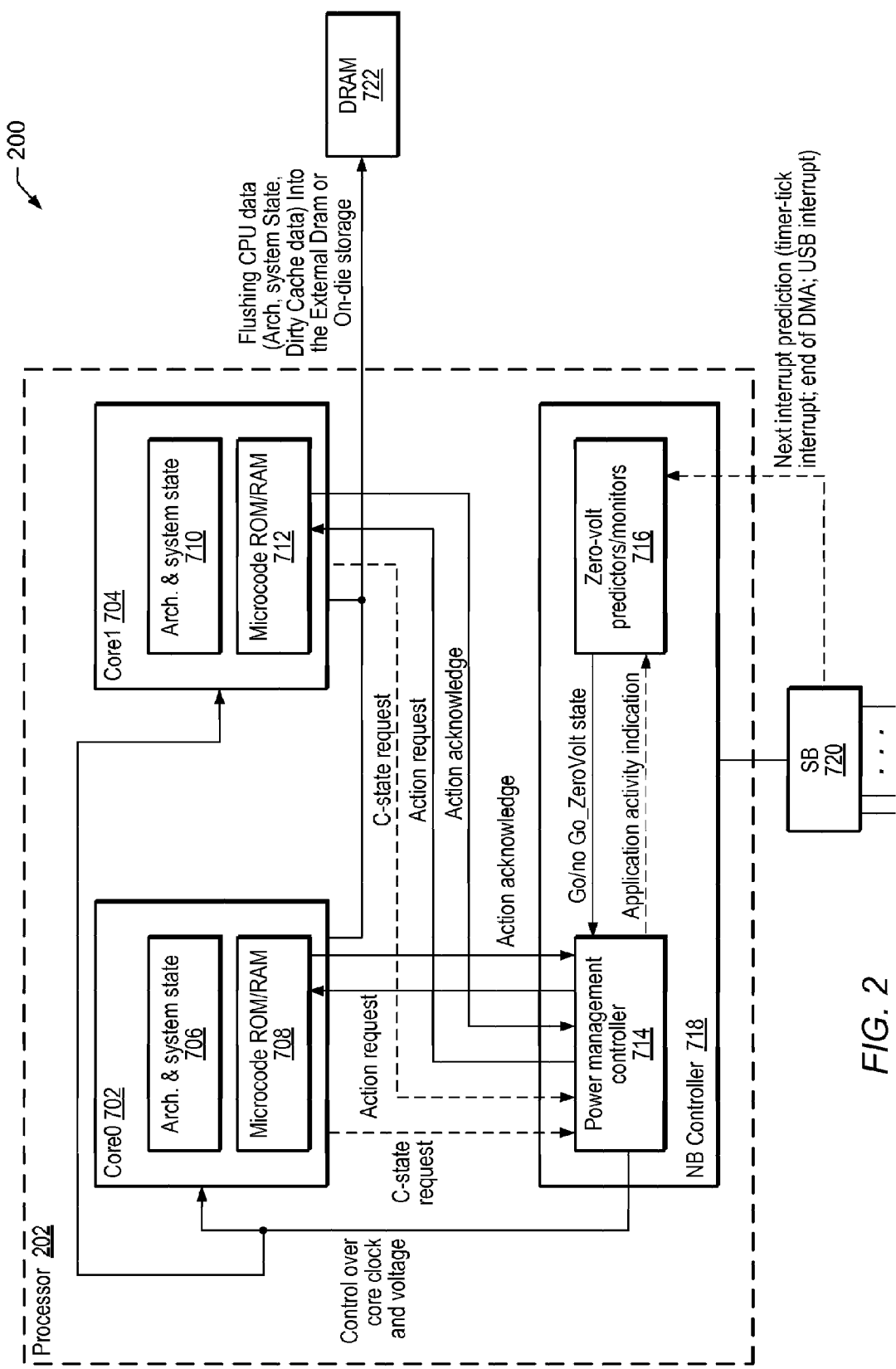
FIG. 2 is a partial logic block diagram of one embodiment of a computer system that includes a processor comprising one or more cores configured to transition between C-states.

FIG. 2 is a partial logic block diagram showing one embodiment of a computer system 200 that includes a processor 202 comprising one or more cores (702 and 704) configured to transition between power states, e.g. C-states using a protocol (which, in one set of embodiments, may be considered a "handshake" protocol) between a controller (718) configured on the processor, and microcode executing on the processor core (e.g., the processor core that is to transition to C6-state). Controller 718 may in general be a circuit (e.g. a "first circuit") configured on processor 202 to perform one or more functions in support of the one or more cores situated on the processor (cores 702 and 704 in the embodiment shown in FIG. 2). This circuit itself may comprise one or more circuits configured to perform one or more functions that may together comprise the full functionality of the circuit (which may also be referred to as a controller or control circuit). As shown in FIG. 2, this circuit is an NB controller (NBC) 718, which may include a circuit (or sub-circuit) configured to perform power management control as one of the functions of the overall functionality of NB controller 718. Furthermore, in yet other embodiments, the circuit (or controller or control circuit) represented in FIG. 2 by NB controller 718 may also be implemented as a distributed circuit, in which respective portions of the distributed circuit may be configured in one or more of the processor cores, but operating on separate power planes, that is, using a different power supply than the section or sections of the cores functionally distinct from the portion or portions of the distributed circuit. The separate power planes, or distinct/separate power supplies may thereby enable each respective portion of the distributed circuit to perform its functions even when the rest of the processor core, e.g. the respective main section or sections (e.g. general processing section or sections) of the processor core that are functionally distinct from the respective portion of the distributed circuit, is in a zero-power state. This enables embodiments that feature a distributed circuit, distributed controller or distributed control circuit performing at least some or all of the functions performed by NB controller 718 shown in FIG. 2.

In the embodiment of FIG. 2, a circuit performing at least a portion of the overall functionality of NB controller 718 is shown as a power management controller (PMC) 714, which may be configured to communicate with each core (702 and 704). More specifically, PMC 714 may be configured to handle C-state requests (i.e. power-state requests) received from core 702 and/or core 704, and interface with non-volatile memory elements, in this case ROMs, 708 and 712, respectively, to provide action requests and receive action acknowledgement to/from the microcode executing on core 702 and/or 704. Cores 702 and 704 may also comprise internal registers 706 and 710, respectively, or some other form of storage medium to hold architecture and system information. NB controller 718 may also interface with South Bridge (SB) 720, and system memory (in this embodiment, DRAM) 722. PMC 714 may also provide control over the supply voltage and operating clock of each core, and may communicate with Low-Power state monitoring and predicting (LMP) block 716 to determine whether transitioning to a requested C-state is to be performed. For example, if PMC 714 has determined that a requested C-state transition corresponds to a request to transition to a C6-state (zero-power HW state), PMC 714 may determine whether or not to perform the transition based on information received from LMP block 716.

Monitoring Functions

In one set of embodiments, LMP block 716 may be configured to perform one or more monitoring functions and/or algorithms for determining whether or not transition to a requested low-power state, or zero-power state (0V state) should be made, once PMC 714 has determined that a requested C-state transition corresponds to a request to transition to a C6-state. Thus, PMC 714 may be configured to convert OS/High-Level software (SW) power-state (C-state) requests into hardware (HW) power-states that correspond to specific power management actions. In addition, PMC 714 may also be configured to infer common C-states, or power-states, for shared resource domains, e.g. processors or processor cores sharing the same voltage or clock plains. It should be noted however, that while the embodiment of FIG. 2 shows controller 718 as having two main components (PM 714 and Predictor/Monitor block 716), these components are shown for the purpose of illustrating certain functionality configured in controller 718. Those skilled in the art will appreciate that the various functionalities described herein may be distributed and/or assigned in a variety of ways within controller 718 specifically, and within processor 202 in general, insofar as to enable processor 202 to function as intended, in transitioning between various power-states. In general, in addition to a C6-state, other states may possibly be designated as low-power states for which monitoring in LMP 716 may be performed. For example, in one set of embodiments C5-state and C6-state may be designated as deep C-states or low-power states for the purposes of such monitoring. In addition, alternate embodiments may implement such monitoring for all possible states (C-states) according to desired system performance and performance indicators, and the monitoring for determining whether transition to a requested target power-state should be allowed to occur may be performed for any of the available C-states, with a boundary (or "fall-through") state designated as a default, to which transitioning may always take place, even in cases when transition to all other states (C-states) may have been blocked.

Therefore, once it has been determined or inferred, for example by PMC 714, which power-state the software/system has requested, (it may be a request for a transition to a low-power state, such as C6-state, for example), controller 718 may prevent this transition from taking place, and in some cases may demote requested C-state transitions to corresponding transitions to another C-state. For example, a requested transition to a C6-state may be demoted to a transition to C5-state or C4-state. In a similar manner, controller 718—or more specifically, in the embodiment shown in FIG. 2, PMC 714 inside controller 718—may promote a transition to a given C-state requested by the system, to a transition to another C-state, based on the indication received from LMP 716 whether transition to a deep C-state or low-power-state should be allowed to take place. Thus, for example, a request to transition to C5-state may be promoted to a transition to C6-state. In one set of embodiments, LMP block 716 may be configured to track both history and recent state status for making a decision whether to allow a given transition to proceed as requested, indicate that the requested transition should be demoted to a transition to a higher performance, or formally, a higher power (i.e. a lower C) state, or indicate that the requested transition should be promoted to a transition to a lower performance, or formally, a deeper power (i.e. a higher C) state, possibly a zero-power (C6) state. Again, the functionality ascribed to LMP block 716 is meant to illustrate functionality associated with power-state transitions of various processors and/or processor cores, and such functionality should not be interpreted as being in any way limited to LPM block 716. Alternate embodiments of which portions of the circuit are configured to perform such functionality are possible and are contemplated. However, for ease of presentation, in the embodiments described herein, PMC 714 is configured to perform power-state inference, while LPM block 716 is configured to perform power-state demotion/promotion.

Therefore, in one set of embodiments, LMP 716 may be configured to perform a variety of specific tasks and/or execute/implement one or more algorithms to determine whether transition to a low-power state should proceed, and/or whether transition to a power state different than the requested power state might be preferable. In addition, PMC 714 may be configured to convert high-level SW power-state requests into HW power-states, and infer common power-states for shared resource domains, as also previously noted.

In one set of embodiments, controller 718 (or specifically, PMC 714) may be configured to determine the target C-state (power-state) a given processor core or processor is targeting, based on the power-state request made by the SW. For multiple processors and/or cores (such as multiple cores 702 and 704 in processor 202 shown in FIG. 2), HW and or SW coordination schemes may be implemented to coordinate the transition of each one of multiple cores and/or processors to various requested power-states. HW-based coordination may be applied when OS/High-Level SW decisions are not sub-optimal or are less controllable, thereby less accurately reflecting current system trends. HW-based coordination may be performed according to performance-biased or power-biased approaches, depending on previously set configuration(s) in OS/High-Level SW. SW-based coordination may be applied when it is assumed that SW (e.g. OS or any other high-level SW) generates a common power-state (C-state) request for shared domains, and/or when it is assumed that the power-state request generated by the SW is based on optimal decisions, which, however, may not always be the case depending on the OS, the various algorithms involved, and other similar factors.

HW-based Coordination

As previously mentioned, HW-based coordination may be used when SW decisions are expected to less accurately reflect current system trends. In one set of embodiments, HW-based coordination may be performed based on whether higher performance or higher power savings is desired. If operation of the system is primarily directed towards high performance, a performance-biased mode may be set, and as a result, a shallower power-state (C-state) with lower denominator may be selected. If operation of the system is primarily directed towards saving power, a power-biased mode may be set, and a deeper power-state (C-state) with deeper denominator may be selected. In one set of embodiments, the coordination may be based on HW-coordination tables establishing a relationship between each pair of power-states (e.g. C-states C1-C6) or between groups of power-states having the same latency.

FIG. 9 shows one embodiment of a coordination table 500 for each pair of applicable power-states for two cores sharing a resource domain (e.g. the cores sharing the same voltage or clock plains). Tables for multiple cores or for pairs of cores may be similarly devised. Each entry in the table represents the power-state assigned to the corresponding pair of processors or processor cores (shown as Core0 C-state [horizontally] and Core1 C-state [vertically] in table 500), based on the originally requested power-state (C-state) for the given cores. For example, as can be seen in the table, regardless of what the requested power-state for one of the cores is, if the requested power-state is C0 (i.e. active state) for the other core, both cores will be placed (or remain) in the active (C0) state. In other words, any processor or processor core in a C0 (active) power-state may impose a C0 power-state on shared domain, even if another processor or processor core requests a non-C0 (non-active) power-state. Split entries (Cx/Cy, where x and y represent power-state levels 0-6) in table 500 show designated power-states corresponding to either performance-biased or power-biased policies, respectively. For example, if the requested power-state for Core0 is C2 and the requested power-state for Core1 is C1, both cores may be respectively placed (or may respectively remain) in state C1, when a performance-biased policy is in place, or state C2 when a power-biased policy is in place.

FIG. 10 shows one embodiment of a coordination table 600 for groups of applicable power-states for two cores sharing a resource domain (e.g. the cores sharing the same voltage or clock plains). Tables for power-state groupings other than shown are also possible and may be similarly devised. In the embodiment shown, power-states may be grouped according to exit latency and power-savings, resulting in three power-state (C-state) groups: C1-C3, C4-C5, and C6 (lowest-power or zero-power state), in addition to the C0 (active state). Similar to table 500 shown in FIG. 9, each entry in table 600 represents the power-state assigned to the corresponding pair of processors or processor cores (shown as Core0 C-state [horizontally] and Core1 C-state [vertically] in table 600), based on the groupings of originally requested power-states (C-state) for the given cores. Also similar to table 500, split entries (Cx/Cy, where x and y represent power-state levels 0-6) in table 600 reference designated power-states corresponding to either performance-biased or power-biased policies, respectively. For example, if the requested power-state for Core0 falls in group C1-C3, and the requested power-state for Core1 falls in group C4-C5, both cores may be respectively placed (or may respectively remain) in one of states C1-C3, when a performance-biased policy is in place, or in one of states C4-C5 when a power-biased policy is in place. Grouping power-states as shown may save HW space by abandoning some level of accuracy. Thus, depending on HW space consideration and required accuracy, table 600 may be used in lieu of table 500 when performing coordination for inferring common power-states for shared resource domains.

Figure 11:
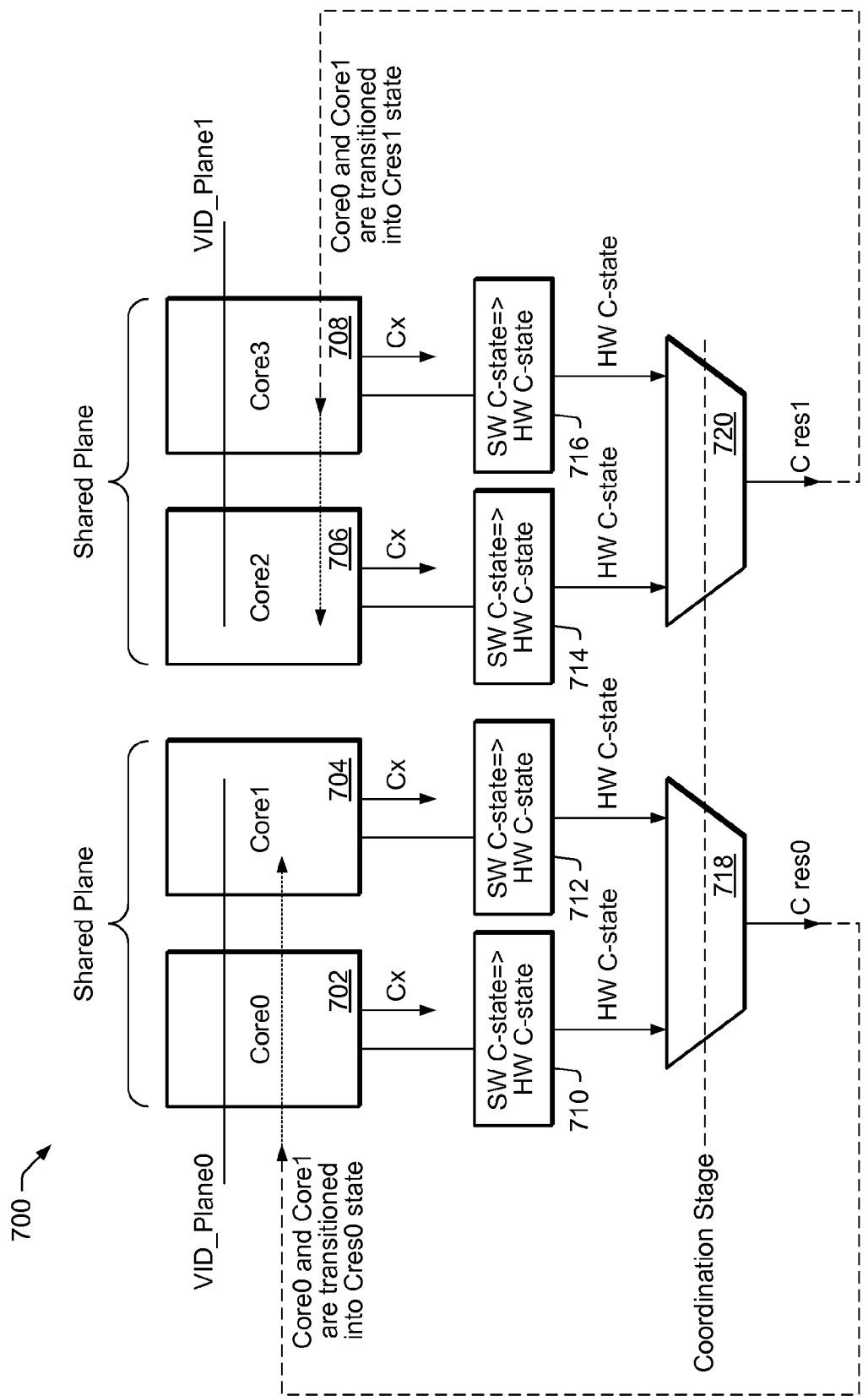
FIG. 11 shows a diagram of a processor system implementing hardware coordination of power-state inference for shared resource domains according to one embodiment.

FIG. 11 shows a logic diagram 700 of a system, which may include a multi-core processor, in which hardware coordination of power-state inference for shared resource domains may be implemented according to one embodiment. The system may feature four processors or processor cores (Core0-Core3, 702-708, respectively), where Core0 and Core1 may share a first supply voltage plane (VID_Plane0), and Core2 and Core3 may share a second supply voltage plane (VID_Plane1). As an example for the configuration shown in FIG. 11, the SW (e.g. OS or any high level SW running on a system which comprises Core0-Core3) may request a respective power-state for each of one or more of cores 702-708, illustrated in diagram 700 as Cx provided from each core. The requested power-states may then be converted to HW power-states for each respective core as indicated in blocks 710-716. The coordination stage (718 and 720) for each shared supply voltage plane (VID_Plane0 and VID_Plane1, respectively) may then determine which HW power-state the cores sharing a given voltage supply plane should transition to, (or remain in, as the case may warrant). Coordination stages 718 and 720 may be based, for example, on tables 500 and/or 600 shown in FIGS. 9 and 10. However, coordination may also be performed according to settings and algorithms different from those shown in tables 500 and 600, and each group of settings and/or algorithms may be specified to meet specific system needs as required.

The following is an example of how transitioning of cores 702-708 to various power-states may take place according to diagram 700, using HW coordination table 500. As per the SW running on a system comprising cores 702-708, Core0 may request power-state C1, Core1 may request power-state C2, Core2 may request power-state C2, and Core3 may request power-state C3. Requested power-state C1 may be converted to HW state C3, requested power-state C2 may be converted to HW state C5, and requested power-state C3 may be converted to HW state C6. For this example, a power biased approach may be specified for all pairs of power-states, except for pairs of power-states that include power-state C6, for which a performance biased approach may be specified. Thus, from table 500, the C res0 output of coordination stage 718 in diagram 700 will be power-state C5, using power biased approach, obtaining the corresponding table entry according to the requested HW power-state C3 for Core0 (corresponding to Core0 in table 500; column C3) and the requested HW power-state C5 for Core1 (corresponding to Core1 in table 500, row C5). Similarly, the C res1 output of coordination stage 720 in diagram 700 will be power-state C5, using performance biased approach obtaining the corresponding table entry according to the requested HW power-state C5 for Core2 (corresponding to Core0 in table 500; column C5) and the requested HW power-state C6 for Core3 (corresponding to Core1 in table 500, row C6).

Table 600 may similarly be used to determine an appropriate power-state for the processors or processor cores, selecting the corresponding table entries based on the respective requested HW power-states for the processors or processor cores sharing power domains. For the example shown above, using the same bias policies (approaches) and requested HW power-states, the C res0 output of coordination stage 718 in diagram 700 would be C4-C5, and the C res1 output of coordination stage 720 would also be C4-C5.

Figure 12:
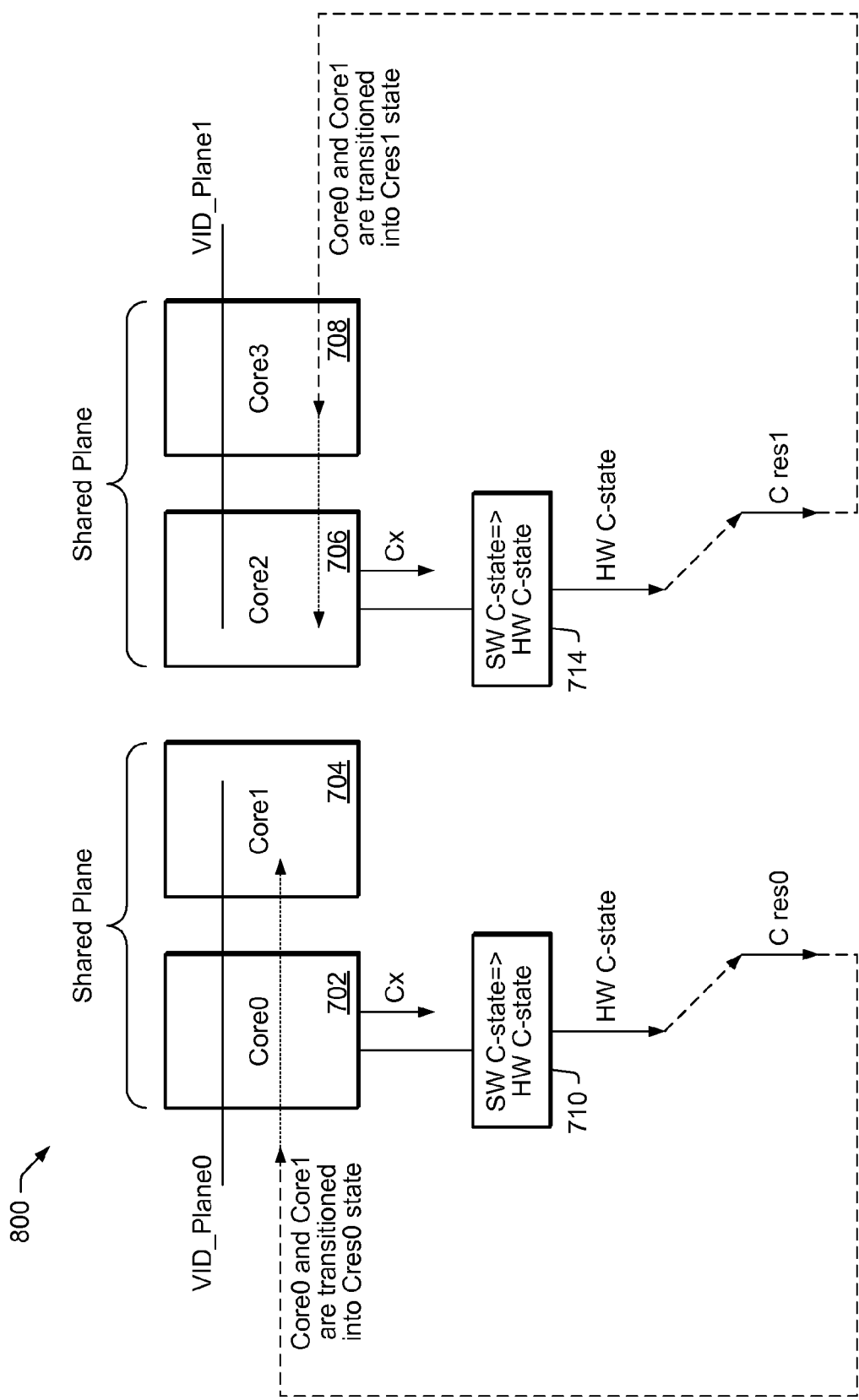
FIG. 12 a diagram of a processor system implementing software coordination of power-state inference for shared resource domains according to one embodiment.

FIG. 12 shows a diagram 800 of a processor system implementing software coordination of power-state inference for shared resource domains according to one embodiment. As previously mentioned, SW-based coordination may be employed when single power-state requests are generated for shared domains, i.e., a single power-state request is generated for all selected processors or processor cores that share a resource domain, such as supply voltage domain, for example. The system shown in FIG. 12 is similar to the system shown in FIG. 11, containing four processors or processor cores (Core0-Core3, 702-708, respectively), with Core0 and Core1 sharing a first supply voltage plane (VID_Plane0), and Core2 and Core3 sharing a second supply voltage plane (VID_Plane1). In diagram 800, power-state requests Cx generated for Core0 702 may also be assumed to have been generated for Core1 704, since those two cores share supply voltage domain VID_Plane0. Similarly, power-state requests Cx generated for Core2 706 may also be assumed to have been generated for Core3 708, since those two cores share supply voltage domain VID_Plane 1.

The following example illustrates how SW-based coordination may be performed. As per the SW running on a system comprising cores 702-708, Core0 may request power-state C1 for both Core0 and Core1 as a single SW coordinated request, and Core2 may request power-state C2 for both Core2 and Core3 as a single SW coordinated request. Requested power-state C1 may be converted to HW state C3 (according to block 710), and requested power-state C2 may be converted to HW state C5 (according to block 714). Again, table 500 may be used to determine the target power-state. In this case, the horizontal entry will match the vertical entry, since a common target power-state was originally requested for Core0 and Core1, and a common target power-state was originally requested Core2 and Core3. Thus, the target power-state C res0 for both Core0 and Core1 will have been determined to be HW power-state C3, and the target power-state C res1 for both Core2 and Core3 will have been determined to be HW power-state C5.

As described above a power-state inference stage, (which in some embodiments may be configured in controller 718 shown in FIG. 2, for example), may determine the target power-state (C-state) for specific processors or processor cores, using HW or SW coordination for shared resource domains, as also described above. Subsequent to said determination, predictors/monitors may be used to confirm whether reaching this specific target power-state is worthy from a performance-loss and/or power-savings standpoint. For example, as previously mentioned, LMP 716 (from FIG. 2) may perform one or more monitoring functions to determine whether transition to the target power-state should proceed, and/or whether transition to a power state different than the requested power state might be preferable, based on various performance and/or power assessments, as further described below.

First Monitoring Function

A first monitoring function may include tracking recent history in the active (C0) state. If the latest residency in the active (C0) state exceeds some threshold (or specific time period), it may be an indication of recent high level of activity on the part of the affected CPU, or on the part of one or more corresponding cores of the CPU (whichever cores reside in the active state in question). This may be in contrast to the CPU—or the one or more cores of the CPU—running idle or executing shorter tasks, and transition to a low-power state, or deep C-state, may result in a loss of application performance due to a potentially long recovery time from exiting the given low-power state or deep C-state (which may be a C6-state).

In other words, the first monitoring function may be directed to determining how active a given application is. If the CPU, or corresponding one or more cores of the CPU that are primarily responsible for executing the application remain in the active state longer than a specific time period, the extended residency in the active state may serve as an indication that the application is active, in which case transitioning to a deep C-state may be undesirable. In one set of embodiments, a counter, possibly a saturation counter, may be used to set/determine when an application may be considered idle for the purpose of making a decision about transitioning into deep C-state. In general, a C0-Residency monitor may be used to predict whether transitioning into deep C-state may result in a loss of performance, due to the relatively long time period that may be required to exit the deep C-state.

Figure 5:
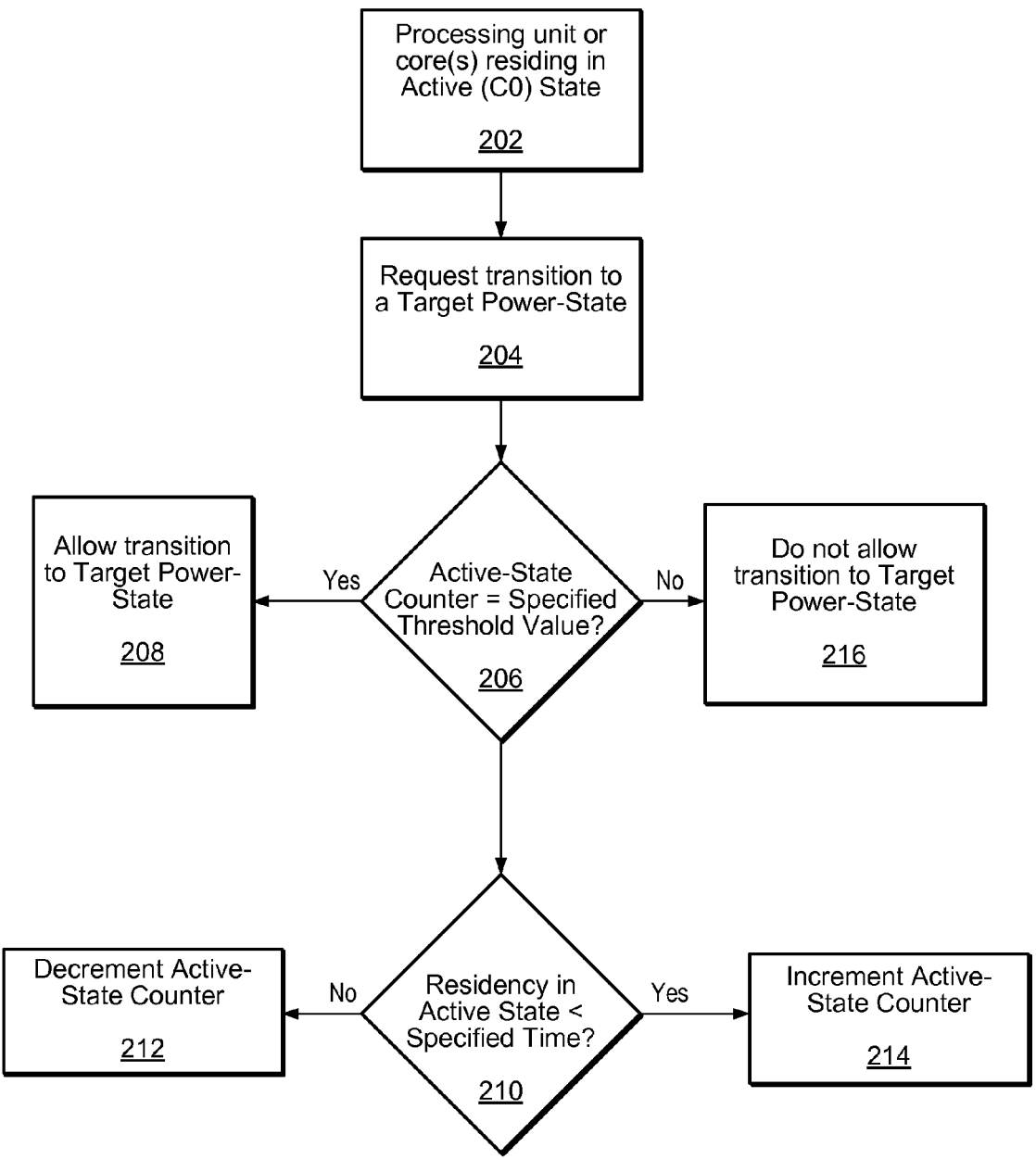
FIG. 5 is a flow diagram of one embodiment of a protocol for monitoring active-state residency of a processing unit.

FIG. 5 shows a flowchart of one embodiment of a C0-Residency, or zero-power residency monitor (monitoring function) that may be used to determine when to transition into deep C-state, or in general into the targeted power-state, without incurring a loss of performance. In one set of embodiments, the zero-power residency monitoring function may be a part of the Controller Predictors determining whether to transition to 0V-state (508) shown in the flowchart of FIG. 3. The processing unit, CPU or corresponding cores of the CPU (e.g. core 702 and/or core 704 in FIG. 2) may be in an active state (202), executing one or more applications. A request for transitioning to a target power-state may be received (204), which may be a request to transition to a zero-power state as determined in (506) in the flow diagram of the embodiment of a protocol for transitioning one or more processor cores to zero-power state shown in FIG. 3. In this case the target power-state would be a zero-power state, or C6-state. The value of an active-state counter may be checked to determine if it is equal to a specific value, which may have been specified in advance (206). When the (value of the) active-state counter is equal to the specified value, the monitoring function may indicate that the target power-state may remain as per the request, e.g. it may remain a deep C-state, such as a C6-state (208). In other words, if transition (in 204) is requested to a target power-state that is, for example, a C6-state, the monitoring function may indicate in (208) that the transition may proceed to the C6-state.

In contrast, when the (value of the) active-state counter is not equal to the specified value (i.e. it is less than the specified value, when the value of the active-state counter is allowed to saturate at the specified value), the monitoring function may indicate that a transition to the target power-state (which, in the example provided, is a C6-state) should not take place (216). The monitoring function may increment and decrement the value of the active-state counter based on how long the processing unit or cores have remained in the active state before a request for a C-state transition is received (204). Thus, the time spent in the active state may be checked (210), and if the residency time was not less than a specified time period (threshold value), the active-state counter may be decremented (212). On the other hand, if the residency time was less than a specified time period, the active-state counter may be incremented (214). In one set of embodiments, in case of (212) the active-state counter may saturate at zero, and in case of (214) it may saturate at the specified value.

Second Monitoring Function

Similar to the embodiment of the Active-State Residency flowchart shown in FIG. 5, a Non-Active-State Residency monitoring function may also be implemented and executed by LMP 716. One embodiment of a Non-Active-State Residency monitoring function is illustrated by way of the flow diagram shown in FIG. 6. The processing unit, CPU or corresponding cores of the CPU (e.g. core 702 and/or core 704 in FIG. 2) may be in an active state (302), executing one or more applications. A request for transitioning to a target power-state may be received (304), which may be a request to transition to a zero-power state as determined in (506) in the flow diagram shown in FIG. 3. In this case the target power-state may again be a zero-power state, or C6-state. The value of a non-active-state counter may be checked to determine if it is less than a first value (or specific value), which may have been specified in advance (306). When the (value of the) non-active-state counter is not less than the specified value (i.e. it is greater than or equal to the specified (first) value, where the value of the non-active-state counter may be allowed to saturate at a second value higher than the first value), the monitoring function may indicate that the target power-state may remain as per the request, e.g. it may remain a deep C-state, such as a C6-state (310) if the target power-state was a deep C-state. In other words, the monitoring function may indicate in (310) that the transition requested to the target power-state (in 304) may proceed as requested.

In contrast, when the (value of the) non-active-state counter is less than the specified value, the monitoring function may indicate that a transition to the target power-state may not take place (308). The monitoring function may increment and decrement the value of the non-active-state counter based on how long the processing unit, CPU, or corresponding cores have remained in the non-active state before a request for a C-state transition is received (304). Thus, the time spent in the non-active state may be checked (314), and if the residency time was less than a specified time period (threshold value), the non-active-state counter may be decremented (312). On the other hand, if the residency time was not less than a specified time period, the non-active-state counter may be incremented (316). In one set of embodiments, in case of (312) the non-active-state counter may saturate at zero, and in case of (316) it may saturate at the specified first value, or a higher, specified second value. By varying the range between the first value (threshold value) and second value (saturation value), the range of values that correspond to allowed state transitions may also be varied.

Figure 6:
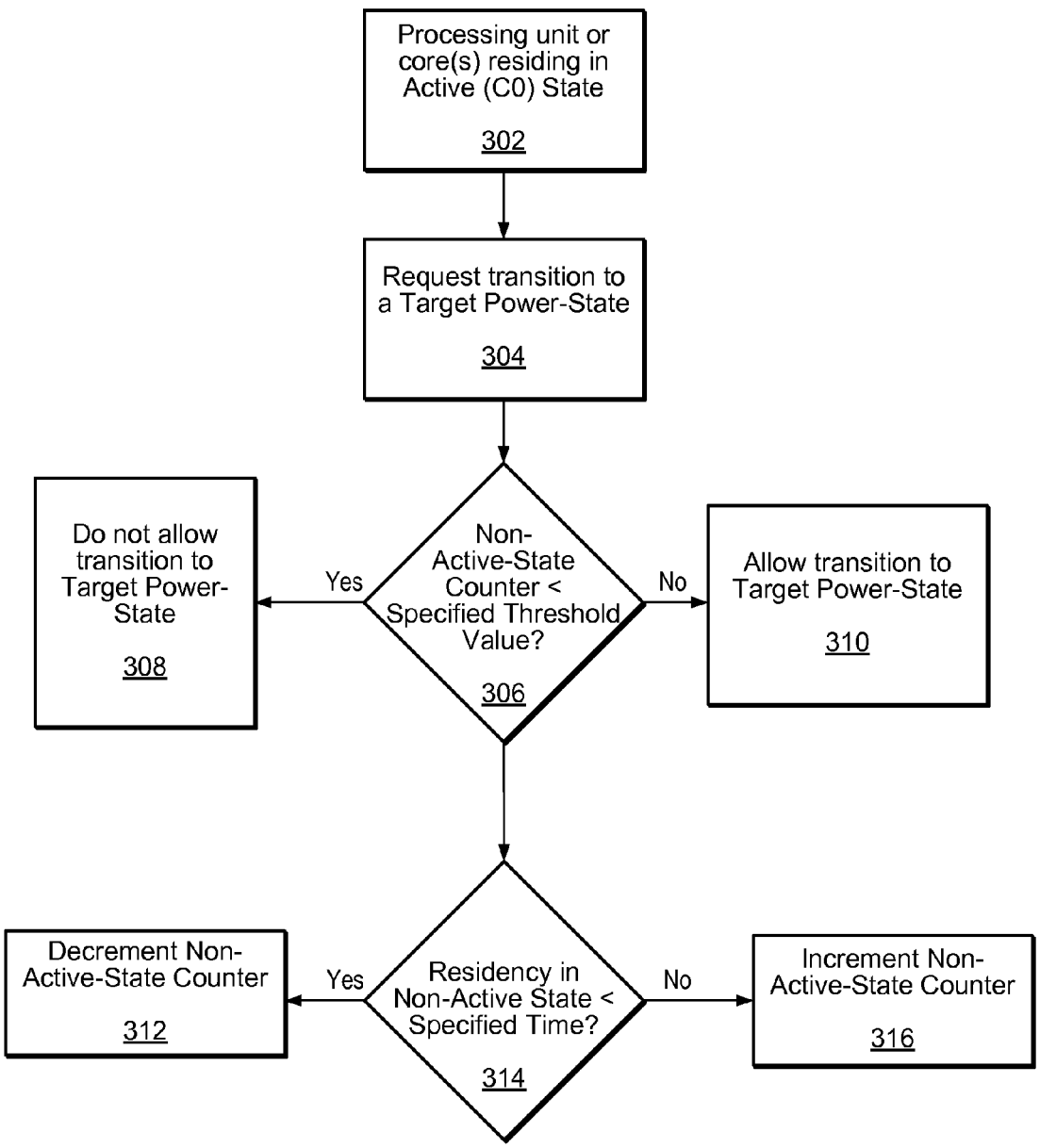
FIG. 6 is a flow diagram of one embodiment of a protocol for monitoring non-active-state residency of a processing unit.

The monitoring function exemplified in the embodiment shown in FIG. 6 may be considered as a means of predicting incoming interrupts when the system is engaged in heavy transfers (e.g. FILE transfers, video/movie playback, etc.), as increased file transfer or video/movie playback activity can be responsible for generating numerous interrupts. A high interrupt rate may be indicative of the processing unit, CPU or corresponding cores remaining in the non-active state for consistently short time periods. The non-active-state counter may or may not be engaged by specifying a higher saturation value than the specified threshold value that may be used for making the decision whether to allow the transition to the requested target power-state. For example, the transition to the requested target power-state may be allowed (based on the non-active-state counter) if the counter is at a specified value of 2 or higher. However, the counter's saturation value may be taken higher than 2 (e.g. 4) to ensure that accidental asynchronous interrupts are filtered out. In other words, two non-active-state saturation counter values (N and M) may be implied, where N is a positive integer and represents a minimal value enabling transition to the requested target power-state, and M is a positive integer greater than or equal to N, and represents the value at which the counter may saturate as it is being incremented.

Third Monitoring Function

A third monitoring function may track changes in a timer tick (TT) interval corresponding to an upper boundary for C-state residency. A TT interrupt may be used by the system (e.g. OS) for periodically waking-up the processing unit/CPU/cores from a low-power state for the purpose of scheduling new tasks. A TT interval may correspond to a time interval that elapses between subsequent TT interrupts (see FIG. 7), and may therefore define an upper limit for low-power state (e.g. zero-volt state) residency for a given OS. For example, the maximum time interval in Microsoft's Vista OS is 15.6 ms. In other words, the OS may automatically wake the processing unit/CPU/cores every 15.6 ms when the processing unit/CPU/cores is in a low-power state. The third monitoring function may be used for immediately capturing changes that the OS may make to the TT interval for specific applications. For example, for multi-media applications the OS may change the TT interval from 15.6 ms to a lower value of 1 ms or 2 ms. Overall, the third monitoring function may operate to determine the length of time the processing unit/CPU/core Core spends in low-power state, to infer the efficiency of the resulting power savings.

When the processing unit/CPU/cores resides in a low-power state (or deep C-state) for only a short time period, the power consumed upon entry and exit to/from the low-power state may substantially negate any potential power savings gained from the processing unit/CPU/cores transitioning and subsequently residing in the low-power state. It may therefore be desirable to cancel the transition to the low-power state in such a case. In one set of embodiments, the controller, e.g. NB Controller 718 in the system of FIG. 2, may track all OS updates of the TT Interval and store the latest TT value. The controller may also track the TT Interrupt itself, and keep track of the actual time left before a next TT interrupt, to determine whether a requested transition to a low-power state should take place.

FIG. 7 shows a timing diagram 400 of one embodiment illustrating the criteria used by the third monitoring function to determine, based on the latest TT interval value stored by the controller (e.g. NB controller 718), whether the requested transition to the target power-state, in this case a low-power state (e.g. C6-state), should be allowed to take place. As shown in FIG. 7, the TT interval may be captured by tracking two subsequent TT interrupts, and may be stored by the controller. The controller may then determine, based on when the request for transitioning to a target power-state is received and when the next TT interval is expected, how long the processing unit/CPU/core would reside in the non-active-state. The "Time to C-state request" in FIG. 7 indicates the time period elapsed between a most recent TT interrupt and when the request for transition to the target power-state is received. If the difference between the TT interval and "Time to C-state request" is greater than a specified power saving threshold (time period) value, then the requested transition to the target power-state, in this case to a low-power state (e.g. C6-state) may be allowed to proceed. Otherwise the requested transition may be prevented, as per the third monitoring function.

Fourth Monitoring Function

In general, the fourth monitoring function may operate as a predictor of impending interrupts (other than the TT interrupts) that may break the deep C-state residency, or residency in a low-power state. For example, if a DMA transfer is in progress, there may be a chance of a corresponding interrupt being issued once the DMA transfer has completed, and such an interrupt may break a low-power state residency. It may therefore be desirable to wait until the DMA transfer has completed to make a decision whether or not to allow a requested transition to deep C-state (low-power state, or a target power-state) to take place. Thus, in one set of embodiments, the interrupts tracked and/or predicted by the fourth monitoring function may correspond to DMA transfers/processes and/or I/O processes. The fourth monitoring function may be configured to track DMA processes to determine whether a corresponding interrupt is expected at the end of the DMA process. In other words, since a DMA transfer may or may not end with a corresponding interrupt, the fourth monitoring function may be configured to track the DMA transfer and wait for a specific time period (a configurable hysteresis period) from the end of the DMA transfer. Once the specific time period expires—indicating that an End-of-DMA Interrupt has not occurred—a requested transition to a Deep C-state may be allowed from the standpoint of this event.

I/O processes may similarly be monitored to predict impending interrupts based on permission received from the I/O domain. In many systems, a hub comprising and/or interfacing with most I/O devices—such as a South Bridge (SB), for example—may be better suited than any other system component to indicate whether or not an interrupt is expected based on I/O activity. For example, an SB may be tracking the operation of USB (Universal Serial Bus) or GBE (Gigabit Ethernet) devices, and may (broadly) be overseeing the I/O domain in general. Therefore, in one set of embodiments, a protocol may be implemented to receive information from the SB to indicate whether or not a requested transition to a target power-state (e.g. low-power state) should be allowed to occur, from the standpoint of certain I/O devices. When no interrupts are expected based on I/O activity, requested transitions to specific target states, e.g. low-power states, may be allowed to occur from the standpoint of the monitored I/O devices.

For example, in a system such as system 200 in FIG. 2, controller 718 may determine that a transition to a target power-state, which may be a low-power state, has been requested. SB 720 may track its internal structures to determine whether to indicate to controller 718 that a requested transition to the low-power state should be allowed or denied. In one set of embodiments, SB 720 may transmit a packet to controller 718, with an indication of "go" (requested transition allowed) or "no go" (requested transition denied). In case of a "no go" indication from SB 720, the processing unit/processor/affected cores may remain in a non-active state, awaiting a pending change of status received from SB 720. For example, should one or more devices get unplugged from the system, SB 720 may subsequently transmit a "go" packet to indicate that the requested transition is cleared. Similarly, SB 720 may also indicate that the requested transition is cleared some time period following the request and the initial indication, even if no devices are unplugged. It may also be conceivable that following a transition to a low-power state, SB 720 may transmit a "no go" packet due to new I/O events/configuration.

As illustrated in diagram 420 in FIG. 8, the fourth monitoring function may indicate that a requested transition to the target power-state, e.g. deep C-state such as C6-state, may take place if no interrupt is received within the specified time period designated as "No end-of-DMA Interrupt Window". A subsequent interrupt may then wake up the processing unit/CPU/cores and cause an exit from the deep C-state. Similarly, as shown in diagram 422 of FIG. 8, while in a non-active state, the controller (e.g. NB Controller 718) may send a request [packet] to I/O (e.g. SB) indicating that a transition to a low-power state has been requested. The SB may respond with either a "go" or "no go" condition [packet], indicating whether to allow the requested transition to the low power-state to take place. In case a "no go" response is received by the controller, the SB may subsequently transmit a go condition, once a specified time period has elapsed without an interrupt. Once in the deep C-state, an interrupt may wake up the processing unit/CPU/cores and cause an exit from the deep C-state, similarly to the conditions shown in diagram 420.

Configuring and Combining the Monitoring Functions

Each of the four monitoring functions may be enabled individually, and the monitoring functions may be configured to operate in concert with each other. In one set of embodiments, a preferred scheme for applying any one or more of the different monitoring functions may be based on system particulars, and which features are present and/or enabled within a given system. For example, by default, the first and second monitoring functions may be enabled in all systems, the third monitoring function may be enabled in systems featuring heavy multi-media traffic, and the fourth monitoring function may be disabled when the I/O configuration is configured predominantly for USB, and/or when end-of-DMA interrupts are not expected in given I/O configurations. Various other combinations are possible, and use of any one or more of the monitoring functions may be determined based on specific system and performance needs. Overall, the first and second monitoring functions may be used for ensuring system performance is not degraded as a result of a processing unit/CPU/cores transitioning into a low-power state, while the third and fourth monitoring functions may be used to ensure that entry into a low-power state provides optimum or maximum power savings.

Power-State Demotion/Promotion Algorithm

While awaiting a "decision" from the monitoring functions (e.g. from LMP 716 shown in FIG. 2), the processor or processor cores may reside in a basic idle power-state (e.g. power-state C1), until a decision from the monitoring functions is returned. If the target power-state is confirmed, then the process to transition to the target power-state is launched, as will further be described below. In case any of the monitoring functions may indicate that transitioning to the target power-state (e.g. a low-power state or zero-power (C6) state) is not to take place, the target power-state may be demoted to a new target power-state (Ctarget), which may be defined by: Ctarget=Ctarget−1. For example, if the inferred Ctarget was C6, then the new Ctarget may be C5, and the process may be repeated. There may be a specified achievable boundary power-state (C-state) per each requested power-state. In one set of embodiments, this boundary power-state may be designated to be always at either higher or the same performance-level, or more formally, the same power-level as the target power-state. For example, C1 may be set as a boundary power-state. Once the demotion process reaches this boundary power-state, it may stop and settle on this power-state. In alternate embodiments, in addition of being configured to demote a target power-state based on feedback from the monitoring functions, a target power-state may also be promoted if it is determined that such promotion is preferred. Target power-state promotion may be performed according to a variety of selected performance and/or power-saving features as implemented in a given system.

Figure 13:
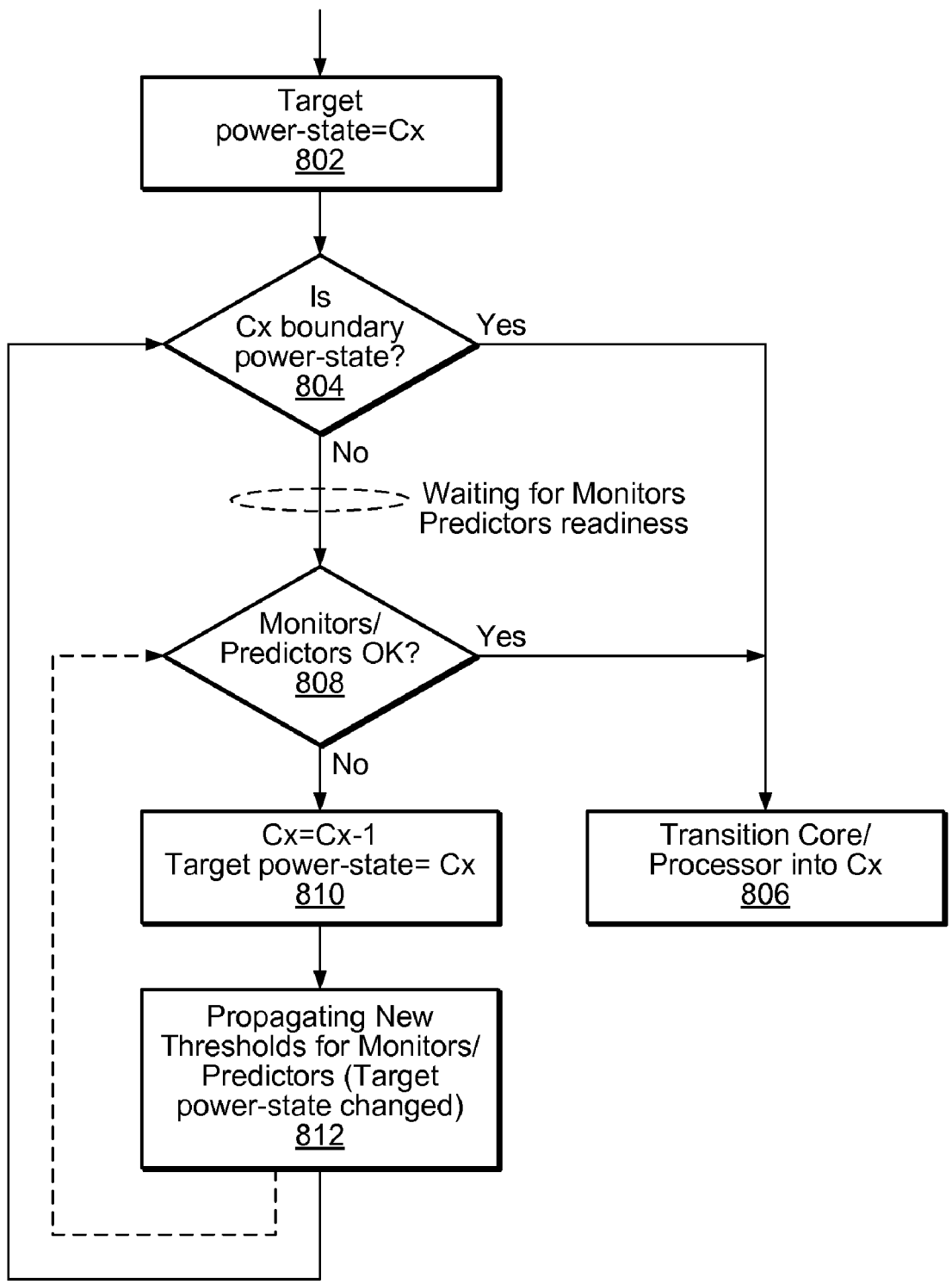
FIG. 13 is a flow diagram of one embodiment of a power-state demotion algorithm.

FIG. 13 is a flow diagram of one embodiment of a power-state demotion algorithm. Once a target HW power-state has been determined (802), and that target power-state is a designated boundary power-state (804), transition to the target power-state may proceed (806). If the target power-state is not a designated boundary power-state (804), a transitioning may wait until monitors and predictors are ready. If the monitors/predictors indicate that transition to the target power-state is cleared (808), transition to the target power-state may proceed (806). If the monitors/predictors indicate that transition to the target power-state is not cleared (808), the target power-state may be demoted (810). In one embodiment, the target power-state may be demoted to the next higher power-state (i.e. the next power-state that is a higher-power power-state; e.g. a zero-power state of C6 may be demoted to a higher-power state of C5). Subsequently, new thresholds according to the changed target power-state may be propagated for the monitors/predictors (812), following which, the target power-state may again be checked (804), and new results from monitors/predictors may be evaluated (808).

Transitioning to a Target Power-State (e.g. Zero-Power State)

Transitioning one or more of cores 702 and 704 to a zero-power state (C6-state) in system 200 will now be described according to FIG. 3, which shows a flow diagram of one embodiment of a protocol for transitioning one or more processor cores to C6-state. An operating system (OS) or high-level software program running on a processor, e.g. processor 202 of FIG. 2, may issue a command comprising a request for one or more cores, e.g. cores 702 and/or 704 of FIG. 2, to transition to a C-state, e.g. C-state x (Cx-state), where x may be a number designating a specific power state (502). The command may be recognizable by microcode executing on the processor core or processor cores, and the microcode may trap the command, and request a controller configured on the processor, e.g. NB controller 718 of FIG. 2, to transition to the given C-state (504). The microcode may then spin, awaiting a subsequent request from the controller (504).

The controller may subsequently determine to which hardware related C-state to transition. In one embodiment, the controller may convert the Cx-state request to a hardware C-state, using BIOS (or driver) configuration, for example, which may result in an indication for a transition to a zero-power (C6) state (506). The controller may determine based on certain predictors whether to transition to the requested C6-state, or to a demoted, lower C-state, i.e. a non-zero-power state (508). If the controller determines that transition to C6-state should not proceed (510), the controller may demote C6-state to a lower C-state (520). If the controller determines that transition to C6-state should proceed (510), the controller may update a register (which may be a power action register comprised within the controller) to specify in the register that a transition to C6-state is to take place, by updating the register to indicate the proper actions to be taken to facilitate and effect transition to C6-state (512). For example, the controller may update the register to indicate the next required action to be a FLUSH core to reach C6-state. After updating the register, the controller may assert an interrupt signal to indicate to the microcode that the microcode may proceed (512). In one set of embodiments, the controller may assert a STPCLK signal, which, according to prior art, is an ACPI defined Southbridge originated request for a processor or processor core to halt execution. As shown in 512, in system 200, for example, the STPCLK signal may be asserted by PMC 714 comprised in NBC 718.

The executing microcode may read the contents of the power action register, and upon recognizing the required operations that need to be performed, perform those operations, such as the FLUSH core operation, which may include flushing the processor core data (e.g. architecture and system state, cache data, etc.) into external system memory or on-die storage (514). Once the required operations (such as FLUSH core) have been performed, the microcode may update a second register (which may be a power acknowledge register configured within the controller) to indicate that the operations have been performed (514). For example, a "Done" bit may be set within the power acknowledge register. The controller may check the power acknowledge register, and upon recognizing that the required operations have been performed, may issue respective requests to gate off the operating clock of the transitioning core, and lower the transitioning core's supply voltage to the specified zero-power state level, which may be specified as 0V in some embodiments (516). Once the supply voltage has been lowered and the operating clock of the core has been uncoupled from the core, the core will reside in C6-state (518).

Figure 3:
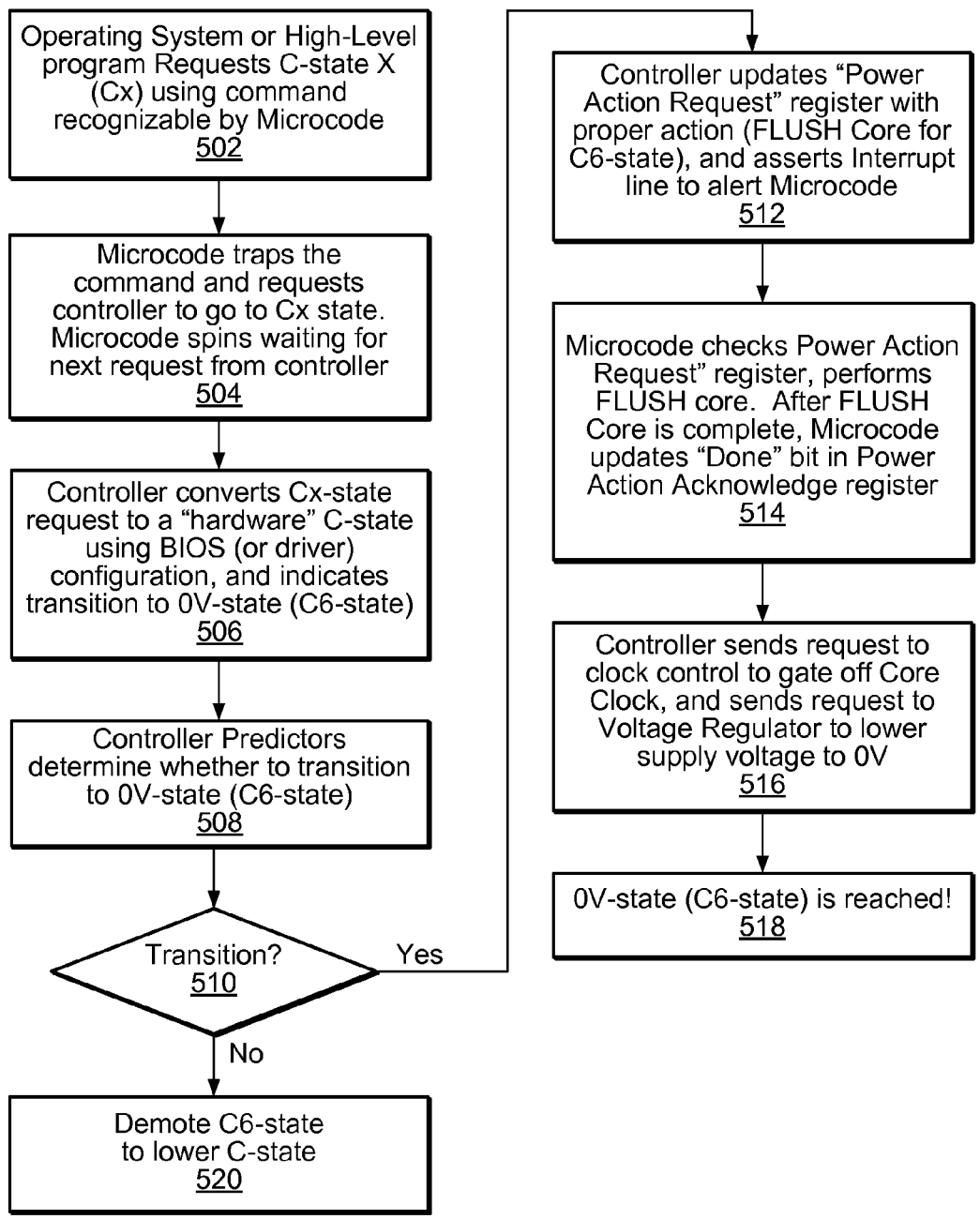
FIG. 3 is a flow diagram of one embodiment of a protocol for transitioning one or more processor cores to C6-state.
Figure 4:
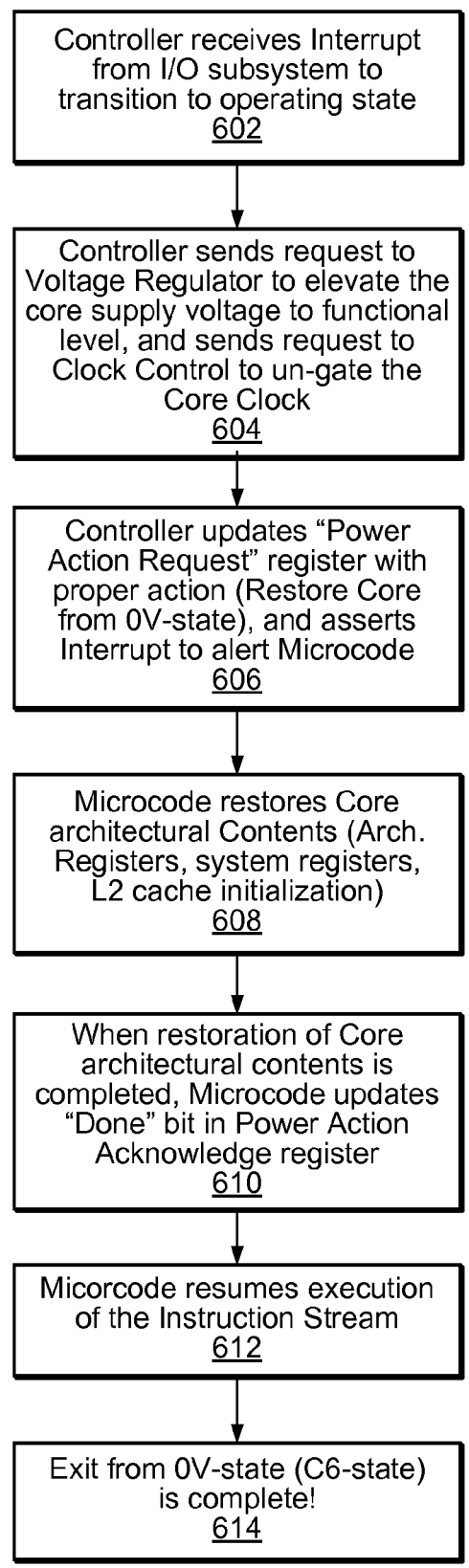
FIG. 4 is a flow diagram of one embodiment of a protocol for transitioning one or more processor cores to an operating state from C6-state.

FIG. 4 is a flow diagram of one embodiment of a protocol for transitioning one or more processor cores to an operating state from a zero-power state, e.g. from C6-state to C0-state. Similarly to the embodiment of the protocol illustrated by the flow diagram shown in FIG. 3, the protocol for transitioning from C6-state to C0-state may also apply, by way of example, to system 200 shown in FIG. 2. While the processor core (or cores) comprised in the processor is (are) in C6-state, the controller (which may be configured on the processor) may receive an interrupt signal, from an I/O subsystem, for example, to transition the processor core to an operating (e.g. C0) state (602). It should be noted that in some embodiments the interrupt signal may be received by a programmable interrupt controller (PIC) configured to handle the interrupt signal, and the PIC may be configured either inside the controller or outside the controller on the processor. Those skilled in the art will recognize that a variety of solutions for handling the interrupt signal on the processor are possible, and many of those solutions may be implemented to fit the protocol described herein. In response to the request, the controller (again, the controller may be a NB controller) may initiate re-activating the core, or cores, that were requested to transition back into an operating state. Accordingly, the controller may send out a request to a voltage regulator responsible for regulating the supply voltage of the core, to elevate the core supply voltage to a functional level (604). The controller may also send a request to a clock-control circuit responsible for providing an operating clock to the core, to un-gate, i.e. to re-couple the operating clock to the core (604). The controller may then update the power action request register to indicate what operations are to be performed for bringing the core back to an operational state, and may subsequently assert an interrupt signal to activate the microcode executable by the core (606). In one set of embodiments, the interrupt signal may be a STARTCLK signal, which may operate to activate a non-volatile storage element configured on the core to store at least an essential portion of the microcode needed by the core to start and continue executing the code.

The executing microcode may check the contents of the power action request register, and begin initializing the core by restoring the architectural and system contents, which may at this time be read back into the appropriate locations within the core from the storage media (external, system memory or on-die memory) where they had been stored as part of the transition into C6-state (608). This may also include initializing the processor cache system (e.g. L1, L2, L3 . . . ), and reading back (e.g. into patch RAM) any portion of the microcode that may have originally resided (e.g. in the patch RAM) outside the non-volatile storage element holding the essential portion of the microcode (608). Once the restoration of the architectural contents of the core has been completed, the microcode may update the power action acknowledge register to indicate that the core is now operational. For example, the microcode may set a "Done" bit inside power action acknowledge register (610). The microcode may then resume execution of the instruction stream on the core (612). Once execution of the instruction stream resumes, the core has completely exited C6-state into an operating (C0) state (614).

It should be noted that while FIG. 2 illustrates a single processor with two cores, the protocol—illustrated by respective embodiments in FIG. 3 and FIG. 4 for entering and exiting C6-state, respectively—may be equally applied to transition a single core or multiple cores (and more than two cores) to and from C6-state, and while some cores reside in C6-state, other cores may simultaneously remain fully functional. In addition, not each core is required to run the exact same microcode, and the controller may be configured to interact with the various different microcodes executed by the various cores. Those skilled in the art will appreciate the various different combinations and configurations in which the protocol may be applied to conduct transition to C6-state fully under the control of the controller (e.g. NB controller) that may be configured on the processor. Referencing FIG. 2, the power action request and power action acknowledge registers may be comprised in NB controller 718, in some embodiments specifically within PMC 714, or may reside in any portion of the processor, including the core, so long that they always remains powered on. In general, the various different combinations and configurations in which the protocol may be used to conduct transitioning in and out of a low-power state and/or zero-power state, e.g. C6-state, may be implemented under the control of a circuit (or "first circuit") configured on the processor to perform one or more functions in support of the one or more cores also configured on the processor. While the discussed embodiments focus on an NB controller, those skilled in the art will appreciate that alternate embodiments with a different circuit, control circuit, distributed circuit (as previously discussed) or controller (or multiple circuits) configured on the processor to execute the protocol are possible and are contemplated, and that all possible embodiments are not limited to those explicitly shown herein.

Benefits and Advantages

As previously mentioned, transitioning to C6-state provides many benefits over other low-power states (other C-state). One benefit is the improved power savings and battery life increase in mobile and server domains, due to the lowering of the static power component to 0 W. In the mobile domain, this may prove relevant for both thin & light and ultra-portable. C6-state also enables aggressive performance improvements in processor process technology and transistor geometry, which may otherwise have to be traded-off versus static power consumption. Accordingly, various embodiments of the protocol as detailed within the following claims may provide a flexible mechanism which may be controlled by the OS and/or HW, for placing one or several cores of a processor (e.g. CPU) in a power down state, or zero-power state, while keeping all other system parts, including other processor cores, chipset, I/O, and DRAM in a fully operational state. This provides a key benefit over system sleep states (e.g. S3-S5) in which all system components are powered down and execution is completely halted. It should also be noted that in accordance with the descriptions of the various embodiments disclosed above, in many embodiments (not shown), the processing units may correspond to a variety of system components, logic blocks, circuits, and/or circuit elements that may all similarly be transitioned to the various power-states as per the principles set forth herein.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

We claim:

1. A method comprising:
    requesting a target power-state for one or more processing units comprised in a system;
    specifying a target hardware (HW) power-state corresponding to the target power-state;
    determining based on one or more operating characteristics of the system whether transition of the one or more processing units to the target HW power-state should take place;
    changing the target HW power-state to an updated HW power-state in response to said determining indicating that the transition of the one or more processing units to the target HW power-state should not take place; and
    transitioning the one or more processing units to the target HW power-state in response to said determining indicating that the transition of the one or more processing units to the HW target power-state should take place.

2. The method of claim 1, wherein the updated HW power-state is one of:
    a specific HW power-state characterized by higher performance and/or higher power consumption than the target HW power-state; or
    a specific HW power-state characterized by lower power-consumption and/or lower performance than the target HW power-state.

3. The method of claim 1 further comprising:
  determining based on one or more operating characteristics of the system whether transition of the one or more processing units to the updated HW power-state should take place; and
  transitioning the one or more processing units to the updated HW power-state in response to said determining indicating that the transition of the one or more processing units to the updated HW power-state should take place.

4. The method of claim 1, wherein said requesting originates from software (SW) executing in the system.

5. The method of claim 1, wherein each HW power-state corresponds to specific power management actions.

6. The method of claim 1, wherein the target HW power-state is one of:
  a zero-volt state; or
  a low-power state.

7. The method of claim 1, further comprising the one or more processing units residing in an idle HW power-state until said determining is completed.

8. A method comprising:
  requesting a respective target power-state for each of a plurality of processing units comprised in a system;
  specifying a corresponding respective target hardware (HW) power-state for each respective target power-state;
  inferring a common target HW power-state based on the respective target HW power-states of processing units of a subset of the plurality of processing units, wherein the processing units of the subset of the plurality of processing units share at least one resource domain; and
  transitioning each processing unit of the subset of the plurality of processing units to the common target HW power-state.

9. The method of claim 8, further comprising performing said inferring for a plurality of respective subsets of the plurality of processing units, wherein respective processing units of each respective subset of the plurality of subsets of the plurality of processing units share at least one resource domain.

10. The method of claim 9, further comprising performing said transitioning for each respective subset of the plurality of subsets of the plurality of processing units.

11. The method of claim 8, wherein said inferring the common target HW power-state comprises one of:
  inferring the common target HW power-state according to HW-based coordination of the processing units of the subset of the plurality of processing units; or
  inferring the common target HW power-state according to software (SW)-based coordination of the processing units of the subset of the plurality of processing units.

12. The method of claim 11, wherein said inferring the common target HW power-state according to HW-based coordination is performed when software (SW) decisions by SW executing in the system do not reflect system trends at a specified level of accuracy.

13. The method of claim 8, wherein said inferring the common target HW power-state comprises selecting the common target HW power-state from two or more candidate HW power-states, wherein the two or more candidate HW power-states are determined by the respective target HW power-states of the processing units of the subset of the plurality of processing units.

14. The method of claim 13 wherein said selecting the common target HW power-state comprises one or more of:
  selecting a candidate HW power-state representing a higher performance and/or higher power consumption level than the other candidate HW power-states, when at least two of the candidate HW power-states represent different respective performance and/or power consumption levels; or
  selecting a candidate HW power-state representing a lower power consumption and/or performance level than the other candidate HW power-states; when at least two of the candidate HW power-states represent different respective power consumption and/or performance levels.

15. The method of claim 13, wherein said selecting the common target HW power-state comprises selecting a HW power-state entry from a coordination table, wherein the coordination table is indexed using the respective target HW power-states of the processing units of the subset of the plurality of processing units.

16. The method of claim 15, wherein each index for the coordination table is formed using:
  a single target HW power-state value; or
  groups of target HW power-state values.

17. A processor comprising:
  a processing core; and
  a controller interfacing with the processing core, wherein the controller is configured to:
    monitor one or more operating characteristics of a system comprising the processor;
    determine based on the one or more operating characteristics of the system whether to allow the processing core to transition to a target hardware (HW) power-state;
    change the target HW power-state to an updated HW power-state in response to a determination that transition to the target HW power-state should not be allowed; and
    transition the processing core to the target HW power-state in response to a determination that transition to the HW target power-state should be allowed.

18. The processor of claim 17, wherein the controller is further configured to:
  receive a request for transitioning the processing core to a target power-state; and
  convert the target power-state to the target HW power-state.

19. The processor of claim 17, further comprising:
  one or more additional processing cores;
  wherein the controller is further configured to:
    determine based on the one or more operating characteristics of the system whether to allow the one or more additional processing cores to transition to respective target hardware (HW) power-states;
    change the respective target HW power-state to a respective updated HW power-state for each of the one or more additional cores for which it is determined that transition to its respective target HW power-state should not be allowed; and
    transition to its respective target HW power-state each one of the one or more additional processing cores for which it is determined that transition to its respective HW target power-state should be allowed.

20. The processor of claim 19, wherein the processing core and the one or more additional processing cores constitute a plurality of processing cores;
wherein the controller is further configured to:
receive respective requests for transitioning any one or more of the plurality of processing cores to respective target power-states; and
specify the respective target HW power-states according to the respective target power-states.

21. The processor of claim 17, wherein the updated HW power-state is one of:
a specific HW power-state representing higher performance and/or higher power consumption than the target HW power-state represents; or
a specific HW power-state representing lower power-consumption and/or lower performance than the target HW power-state represents.

22. A system comprising:
one or more processing units; and
a control unit configured to:
monitor one or more operating characteristics of the system;
determine based on the one or more operating characteristics of the system whether to allow the one or more processing units to transition to respective target hardware (HW) power-states;
change the respective target HW power-state to a respective updated HW power-state for each of the one or more processing units for which it is determined that transition to its respective target HW power-state should not be allowed; and
transition to its respective target HW power-state each one of the one or more processing units for which it is determined that transition to its respective HW target power-state should be allowed.

23. The system of claim 21, wherein the control unit is further configured to:
receive respective requests for transitioning any one or more of the one or more processing units to respective target power-states; and
specify the respective target HW power-states according to the respective target power-states.

24. A system comprising:
one or more processing units, each respective processing unit of the one or more processing units comprising:
one or more state registers; and
non-volatile memory configured to store microcode instructions executed by the respective processing unit;
a power management controller interfacing with the non-volatile memory of each respective processing unit of the one or more processing units, and configured to:
communicate with the non-volatile memory of each respective processing unit of the one or more processing units to recognize when a respective request is made to transition the respective processing unit to a respective target power-state;
specify a respective target hardware (HW) power-state that corresponds to the respective target power-state; and
a monitor interfacing with the power management controller, and configured to:
track one or more operating characteristics of the system, including operation of the one or more processing units;
determine based on the one or more operating characteristics of the system, including operation of the one or more processing units, whether the respective processing unit should be allowed to transition to its respective target HW power-state;
wherein the power management controller is further configured to change the respective target HW power-state of the respective processing unit to a respective updated HW power-state when the monitor determines that the respective processing unit should not be allowed to transition to its respective target HW power-state.

25. The system of claim 24, wherein the power management controller is further configured to transition the respective processing unit to its respective target HW power-state when the monitor determines that the respective processing unit should be allowed to transition to its respective target HW power-state.

26. The system of claim 24, wherein the respective HW power-state is one of:
a low-power state;
a zero-volt state; or
a non-active state.

27. The system of claim 24, wherein the system is a processor and the one or more processing units are processor cores.

28. The system of claim 24, wherein the respective updated HW power-state is one of:
a specific HW power-state representing higher performance than the respective target HW power-state represents; or
a specific HW power-state representing lower power-consumption than the respective target HW power-state represents.

29. A system comprising:
a plurality of processing units; and
a control unit configured to:
receive requests for transitioning the plurality of processing units to respective target power-states;
specify respective target hardware (HW) power-states corresponding to the respective target power-states; and
infer a common target HW power-state based on the respective target HW power-states of processing units of a subset of the plurality of processing units, wherein the processing units of the subset of the plurality of processing units share at least one resource domain;
wherein the common target HW power-state replaces the respective target HW power-state of each processing unit of the subset of the plurality of processing units.

30. The system of claim 29, wherein the control unit is further configured to transition each processing unit of the subset of the plurality of processing units to the common target HW power-state.

31. The system of claim 29, wherein in inferring the common target HW power-state, when the requests comprise a single request for transitioning the processing units of the subset of the plurality of processing units to a first respective target power-state, the control unit is operable to designate the respective HW power-state that corresponds to the first respective target power-state to be the common target HW power-state.

32. The system of claim 29, wherein in inferring the common target HW power-state, when the requests comprise a respective request for each processing unit of the subset of the plurality of processing units to transition to a respective target power-state, the control unit is configured to select the common target HW power-state from the respective target HW power-states of the processing units of the subset of the plurality of processing units.

33. The system of claim 29, further comprising a monitoring unit configured to determine based on the one or more operating characteristics of the system, including operating characteristics of the plurality of processing units, whether to allow the subset of the plurality of processing units to transition to the common target hardware (HW) power-state.

34. The system of claim 33, wherein the control unit is configured to:
   change the common target hardware (HW) power-state to an updated target HW power-state if the monitoring unit determines that transition to the common target HW power-state should not be allowed; and
   transition the subset of the plurality of processing units to the common HW power-state each if the monitoring unit determines that transition to the common HW target power-state should be allowed.

35. A control unit comprising:
   an input block configured to receive requests for transitioning a plurality of processing units to respective target power-states; and
   a processing block configured to:
      specify respective target hardware (HW) power-states corresponding to the respective target power-states; and
      infer a common target HW power-state based on the respective target HW power-states of processing units of a subset of the plurality of processing units, wherein the processing units of the subset of the plurality of processing units share at least one resource domain;
   wherein the common target HW power-state replaces the respective target HW power-state of each processing unit of the subset of the plurality of processing units.

36. A control unit comprising:
   a monitoring block configured to:
      monitor one or more operating characteristics of a system; and
      determine based on the one or more operating characteristics of the system whether to allow one or more processing units to transition to respective target hardware (HW) power-states; and
   a processing block configured to:
      change the respective target HW power-state to a respective updated HW power-state for each of the one or more processing units for which it is determined that transition to its respective target HW power-state should not be allowed; and
      transition to its respective target HW power-state each one of the one or more processing units for which it is determined that transition to its respective HW target power-state should be allowed.

* * * * *